(12) United States Patent
Hall et al.

(10) Patent No.: US 6,216,065 B1
(45) Date of Patent: Apr. 10, 2001

(54) METHOD AND SYSTEM FOR CREATING AN APPROACH TO A POSITION ON THE GROUND FROM A LOCATION ABOVE THE GROUND

(75) Inventors: Gary W. Hall, Fort Worth; Michael Homan, Roanoke; Ron Bell, Grapevine, all of TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 09/369,899

(22) Filed: Aug. 6, 1999

(51) Int. Cl.[7] .................................................. G08G 5/04
(52) U.S. Cl. ................................ 701/16; 701/301; 342/29
(58) Field of Search ................................. 701/16, 301, 14, 701/17; 73/178 T; 342/29, 30, 31, 32; 244/183, 184, 185, 186, 187, 188, 189, 3.15, 3.18, 3.17, 175; 340/979, 980

(56) References Cited

U.S. PATENT DOCUMENTS

| | | | |
|---|---|---|---|
| 4,939,663 | 7/1990 | Baird | 364/449 |
| 5,086,396 | 2/1992 | Waruszewski, Jr. | 364/454 |
| 5,216,611 | * 6/1993 | McElreath | 701/16 |
| 5,340,061 | 8/1994 | Vaquier et al. | 244/175 |
| 5,381,338 | 1/1995 | Wysocki et al. | 364/449 |
| 5,610,815 | 3/1997 | Gudat et al. | 364/424.027 |
| 5,627,546 | 5/1997 | Crow | 342/352 |
| 5,645,890 | 7/1997 | Nicosia et al. | 364/428 |
| 5,661,486 | 8/1997 | Faivre et al. | 342/33 |
| 5,715,163 | 2/1998 | Bang et al. | 364/444.2 |
| 5,786,773 | * 7/1998 | Murphy | 701/16 |
| 5,797,106 | 8/1998 | Murray et al. | 701/11 |
| 5,801,659 | 9/1998 | Helfrick | 342/357 |
| 5,820,080 | * 10/1998 | Eschenbach | 701/16 |
| 5,839,080 | * 11/1998 | Muller et al. | 701/301 |
| 5,884,219 | 3/1999 | Curtwright et al. | 701/213 |
| 5,884,223 | * 3/1999 | Tognazzini | 701/301 |
| 5,987,362 | * 11/1999 | Bessalini et al. | 244/3.15 |

FOREIGN PATENT DOCUMENTS

| | | | |
|---|---|---|---|
| 0 399 670 A2 | 4/1990 | (EP) | G01C/23/00 |
| WO 98/15912 | 4/1998 | (WO) | G05F/165/00 |

* cited by examiner

Primary Examiner—Richard M. Camby
(74) Attorney, Agent, or Firm—Gardere Wynne Sewell LLP; Sanford E. Warren, Jr.

(57) ABSTRACT

A method and system for creating a precision approach for an aircraft to a position on the ground from a location above the ground is disclosed. The system comprises a display unit onboard the aircraft that displays a digital moving map, a database onboard the aircraft that contains digital terrain elevation data and obstacle data, a global positioning receiver that identifies the in flight position of the aircraft and an input device use to select the position on the ground displayed on the digital moving map. A processor that is also onboard the aircraft is communicably linked to the display unit, the database and the global positioning receiver. The processor generates the digital moving map on the display unit from the digital terrain elevation data and obstacle data and creates an approach derived from global positioning system data for the aircraft to the position on the ground selected on the digital moving map based upon the in flight position of the aircraft.

28 Claims, 3 Drawing Sheets

METHOD AND SYSTEM FOR CREATING AN APPROACH TO A POSITION ON THE GROUND FROM A LOCATION ABOVE THE GROUND

TECHNICAL FIELD OF THE INVENTION

This invention relates in general to creating an approach to a position on the ground for an in flight aircraft or in the flight planning phase and, in particular, to a method and system for utilizing a global positioning system and an onboard computer to create a precision approach procedure to any location on the ground for which digital terrain elevation data is available.

BACKGROUND OF THE INVENTION

Without limiting the scope of the invention, the background will describe the satellite based global positioning system, as an example.

The satellite based global positioning system (GPS) includes twenty-four satellites, orbiting 11,000 miles above the surface of the earth that emit signals to receivers below. By measuring the travel time of a signal transmitted from each satellite, a receiver can calculate its distance from that satellite. Satellite positions are used by a receiver as precise reference points to determine the location of a receiver. When receiving the signals from at least four satellites, a receiver can determine latitude, longitude, altitude and time, each of which are necessary in the navigation of an aircraft. The basic GPS service provides users with approximately 100 meter accuracy ninety-five percent of the time anywhere on or near the surface of the earth.

The benefits of satellite navigation over those of traditional navigation systems are significant. Satellite based systems achieve greater accuracies than most existing land based systems because the satellite signals are propagated independent of the ground making the system less prone to ground derived errors. Furthermore, because the satellite signals are available worldwide, GPS represents an unique opportunity for the international aviation community to start converging toward the goal of a single, integrated Global Navigation Satellite System (GNSS).

GNSS will eventually allow aviation users to reduce the number of different types of receivers required for navigation services for all phases of flight. Coupled with satellite communications, satellite based navigation will contribute to increased safety and efficiency of international civil aviation by supporting real time surveillance of aircraft and reducing the separation requirements.

The transition from various ground based systems to a common satellite based navigation system on a worldwide scale will require tremendous cooperation among international civil aviation authorities, governments, and industry representatives. The FAA is involved in such a transition on a national basis and has made the commitment to move from its own extensive ground based communications, navigation and surveillance system to one which will rely primarily on satellite navigation. This transition will not only prepare the U.S. National Airspace System (NAS) to meet the demands placed upon it by ever increasing aviation operations, but will serve the goals of the international community by beginning the transition to a seamless worldwide global satellite navigation system.

The FAA began the transition to GPS based navigation in 1994 with the approval of GPS as a supplemental navigation aid for en route through nonprecision approach phases of flight. This was followed by approval of GPS as a primary means of navigation in the oceanic environment as well as for remote operations. These two operational approvals are contingent upon the use of a properly certified Technical Standard Order (TSO) C129A GPS receiver which includes the Receiver Autonomous Integrity Monitoring (RAIM) feature to verify system integrity. In addition, to support this capability, GPS procedures were developed.

The next significant step in the FAA's transition to satellite based navigation is a Satellite Based Augmentation System (SBAS) called the Wide Area Augmentation System (WAAS) WAAS will satisfy the FAA requirements to be used as the only radio navigation aid for all flight operations down to and including Category 1 precision approaches. WAAS alone will not satisfy the FAA requirements for Category 2/3 precision approaches, nor will it satisfy the requirements for Category 1 approaches outside the WAAS coverage area.

For this reason, the FAA is also planning to implement a Ground Based Augmentation System (GBAS) called the Local Area Augmentation System (LAAS). LAAS is intended to satisfy FAA precision approach requirements for accuracy, availability, and integrity in order to provide Category 1 precision approach capability where the WAAS cannot, as well as Category 2/3 precision approach capability. In addition, the LAAS signal allows the user to have highly accurate position information anywhere in the airport vicinity, enabling the potential use of LAAS as an all weather surface navigation sensor and an input to surface surveillance/traffic management systems.

It has been found, however, that even with the implementation of the LAAS, only aircraft in the vicinity of an airport will be able to perform Category 2/3 precision approaches. Thus, for such precision approaches of, for example, helicopters or tiltrotors, in areas not covered by the LAAS, a need has arisen for a method and system for utilizing GPS to create a precision approach procedure to a position on the ground using onboard equipment.

SUMMARY OF THE INVENTION

The present invention disclosed herein comprises an onboard computer based method and system that utilizes a global positioning system for creating an approach to a position on the ground for an in flight aircraft. The system includes a display unit onboard the aircraft which may be a touch screen. The display unit provides a display of a digital moving map to the pilot or flight crew. The system also includes a database onboard the aircraft. The database contains digital terrain elevation data and obstacle data. A global positioning receiver that communicates with the global positioning system identifies the in flight position of the aircraft which may be represented by aircraft symbology on the digital moving map displayed on the display unit.

When the pilot wants to land the aircraft, the pilot uses an input device to enter coordinates or to select the desired point on the ground displayed on the digital moving map as well as other information such as desired landing direction. Thereafter, a processor onboard the aircraft creates a precision approach for the aircraft to that position on the ground from the in flight position of the aircraft. The approach is suitable for instrument meteorological conditions or for visual meteorological conditions. The approach includes direction, elevation and distance to the position on the ground. The approach may also include altitude penalties for obstacles and elevation changes in the terrain.

In one embodiment of the present invention, the system includes a real-time mapping device, such as a Doppler radar or a diode laser, that identifies obstacles in the approach. The identified obstacles are then compared to the obstacle data in the database to verify the validity of the obstacle data in the database. This verification allows the system to modify the approach if necessary based upon the identified obstacles.

The method of the present invention involves generating a digital moving map on a display unit onboard the aircraft from digital terrain elevation data and obstacle data stored in a database onboard the aircraft, identifying the in flight position of the aircraft with a global positioning receiver, selecting the desired position on the ground displayed on the digital moving map and creating a precision approach for the aircraft to the position on the ground. The approach may be for instrument meteorological conditions or visual meteorological conditions. The approach includes direction, elevation and distance to the position on the ground and may include altitude penalties for unknown obstacles.

The method also includes displaying aircraft symbology on the digital moving map based upon the in flight position of the aircraft. In one embodiment, the method further includes identifying obstacles in the approach, comparing the identified obstacles to the obstacle data in the database, verifying the validity of the obstacle data in the database and modifying the approach if necessary.

The present invention may be embodied in a computer program embedded in a computer readable medium. The computer program includes a code segment for generating a digital moving map on a display unit onboard the aircraft from digital terrain elevation data and obstacle data stored in a database onboard the aircraft. The computer program also includes a code segment for identifying the in flight position of the aircraft with a global positioning receiver, a code segment for selecting the point on the ground displayed on the digital moving map and a code segment for creating a precision approach for the aircraft to the position on the ground. The computer program may include a code segment for displaying aircraft symbology on the digital moving map based upon the in flight position of the aircraft and a code segment for applying an altitude penalty for obstacles and elevation changes in the terrain.

The computer program may additionally include a code segment for comparing obstacles identified with a real-time mapping device with obstacle data in the database, a code segment for verifying the validity of the obstacle data in the database and a code segment for modifying the approach if necessary.

BRIEF DESCRIPTION OF THE DRAWINGS

For a more complete understanding of the present invention, including its features and advantages, reference is now made to the detailed description of the invention, taken in conjunction with the accompanying drawings of which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
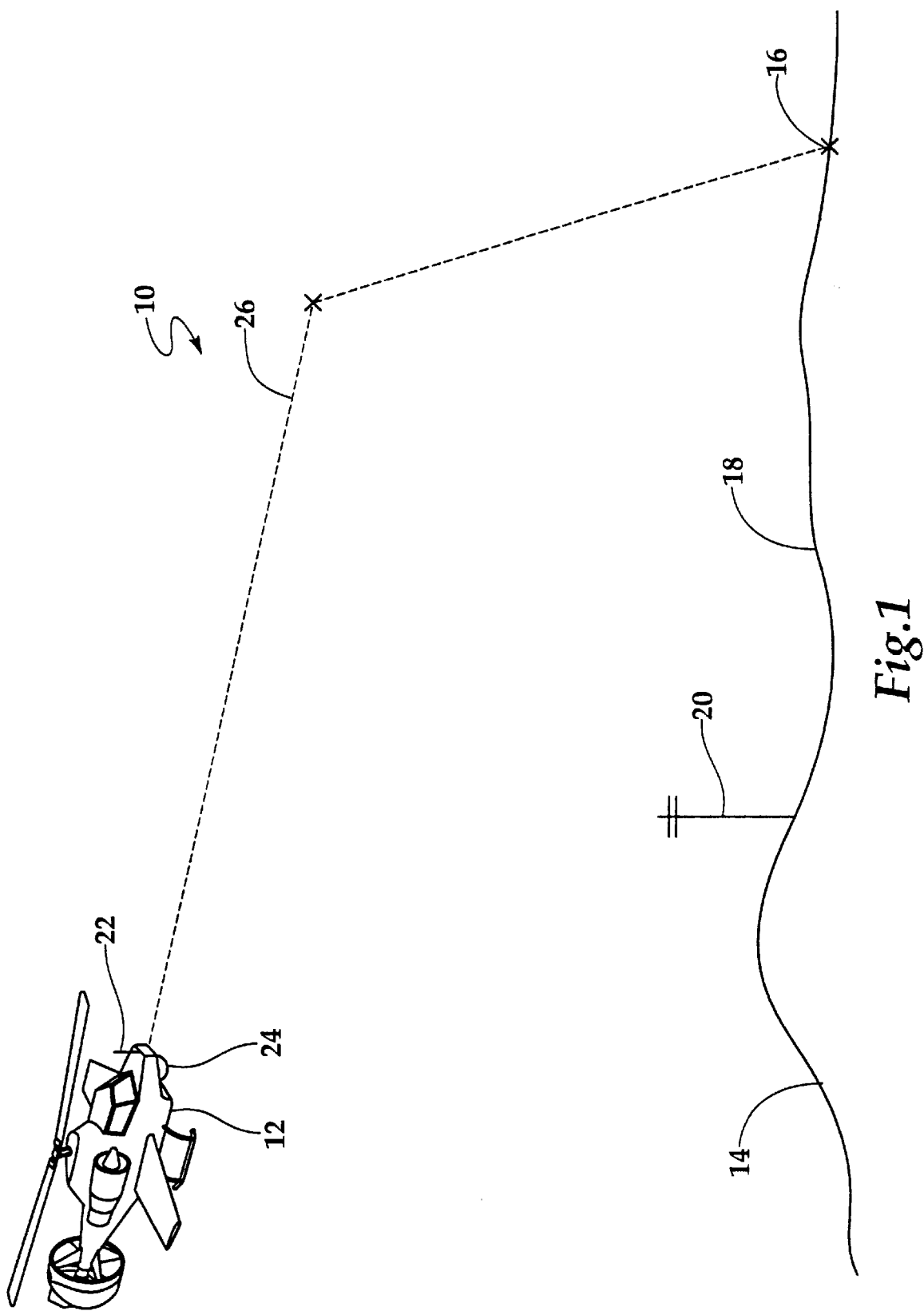
FIG. 1 is a schematic illustration of a helicopter utilizing a system for creating an approach to a position on the ground of the present invention.

FIG. 1 is a schematic illustration of a helicopter preparing to land on a position on the ground that is generally designated 10. The helicopter 12 is flying in the air above the ground 14. The pilot of helicopter 12 has identified a location 16 on the ground 14 upon which he wishes to land the helicopter 12. The ground 14 has a variety of different elevations which will be referred to herein as terrain 18. In addition, a variety of obstacles, such as a tower 20 may also be present on the ground 14.

The helicopter 12 includes a global positioning receiver 22 that receives transmissions from at least four satellites in a global positioning system. The satellite positions are used by the receiver 22 as precise reference points to determine the location of the receiver 22. When receiving the signals from at least four satellites, the receiver 22 can determine latitude, longitude, altitude and time. As will be explained in greater detail below, the helicopter 12 may also include an onboard computer system that processes the GPS data such that the position of the helicopter 12 with respect to the terrain 18 and any obstacles 20 can be determined.

A database onboard the helicopter 12 includes information relating to terrain elevation data and obstacle data such that a digital moving map may be displayed to the pilot of the helicopter 12. In addition, a real time mapping device 24 such as a Doppler radar, diode laser or the like may be used for real time mapping of the ground 14 to determine the terrain 18 and any obstacles 20 and compare such data to the terrain elevation data and obstacle data stored on the database within the helicopter 12. The real time mapping data may be used to verify the validity of terrain elevation data and obstacle data stored within the database or may be used independent thereof. Using the terrain elevation data and obstacle data stored in the data base, identified with the real time mapping device 24 or both, the computer onboard helicopter 12 creates a precision approach from the in flight position of the helicopter 12 to the position 16 on the ground 14.

Figure 2:
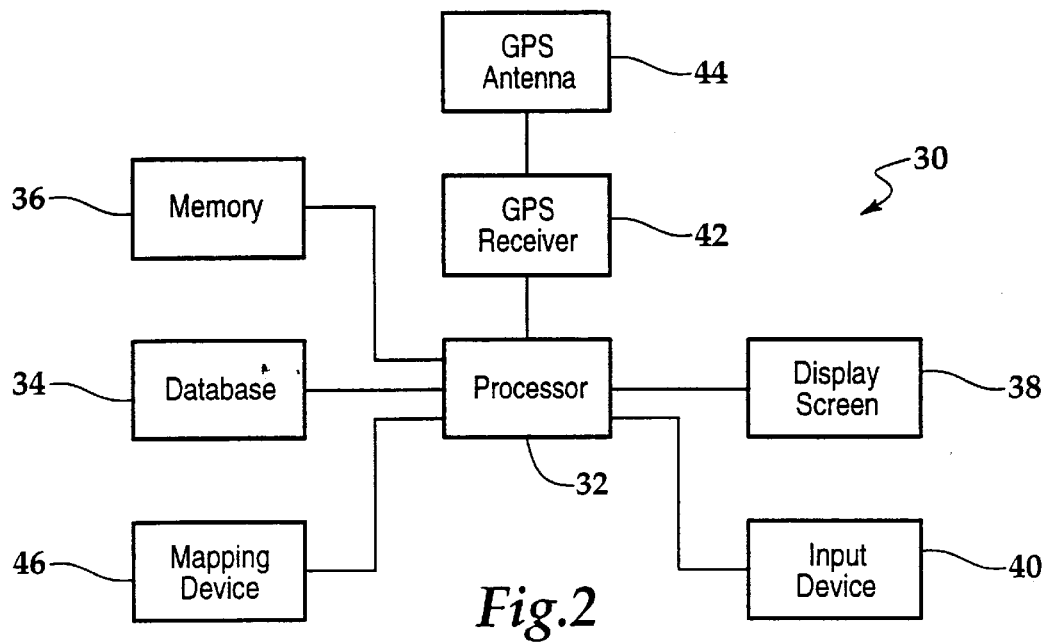
FIG. 2 is a block diagram of the components of a system for creating an approach to a position on the ground of the present invention.

Referring now to FIG. 2, therein is a block diagram of one implementation of a system according to the present invention that is generally designated 30. A processor 32 is connected to a data storage device 34. Data stored in the data storage device 34 may include digital terrain elevation data and obstacle data. These and other types of data may be organized in any desirable configuration for facilitating the operation of a system of the present invention as described below. The data storage device used to hold the data may be a CD-ROM. Read/write devices may also be employed, however, portions of the data are preferably temporarily retained or cached in other data storage devices for faster access as desired.

The processor 32 is also connected to a data storage device 36 so as to be able to store and retrieve data therefrom. The data storage device 36 may be a RAM or magnetic media or a combination thereof, or other similar memory. The processor 32 is also connected to a display screen 38 for displaying map images and information to a user. The processor 32 is connected to at least one user input device 40 such as a keyboard, keypad, touchscreen, mouse, or the like to allow user input. The processor 32 is connected to a global positioning system (GPS) receiver 42 that receives global positioning information via global positioning system antenna 44. The processor 32 is also connected to a real time mapping device 46 that provides real time terrain elevation data and obstacle data to the processor 32.

In operation, the processor 32 uses the digital terrain elevation data to display a digital moving map image on the display screen 38 that may be centered at a latitude and longitude supplied to the processor 32 from the GPS receiver 42. The processor 32 updates the displayed image each time it receives a new latitude and longitude. Thus as the helicopter 12 moves, the latitude and longitude sensed by the GPS receiver 42 changes and the map image is updated, giving the appearance of a single continuously scrolling map image moving across the surface of the display area of the display screen 38.

When a desired landing position on the ground as displayed on the display screen 38 is entered into the system with the input device 40, the processor 32 generates an approach to that position that is displayed on the digital moving map on the display screen 38. Such a display is shown schematically on the digital moving map images depicted in FIGS. 3 and 4.

Figure 3:
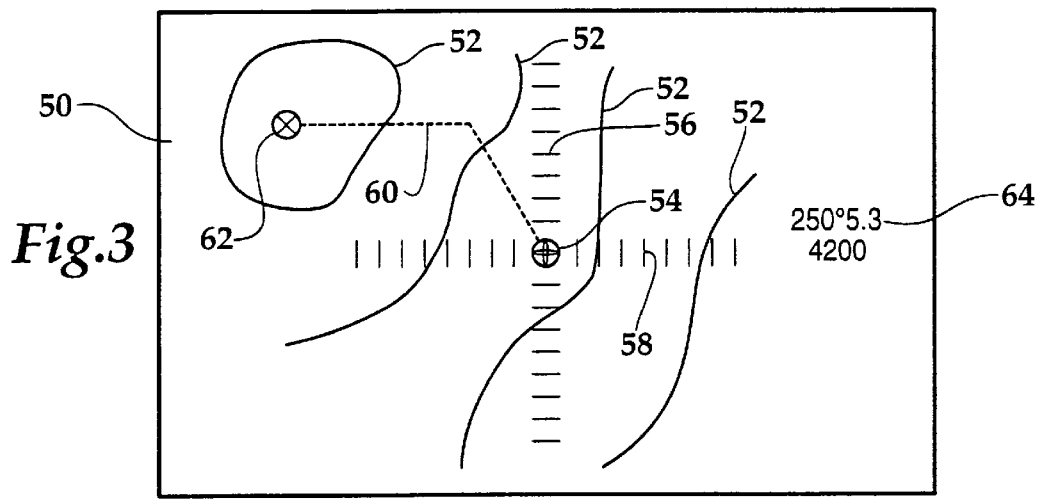
FIG. 3 is a schematic illustration of a display unit displaying a terrain contour map for a system for creating an approach to a position on the ground of the present invention.
Figure 4:
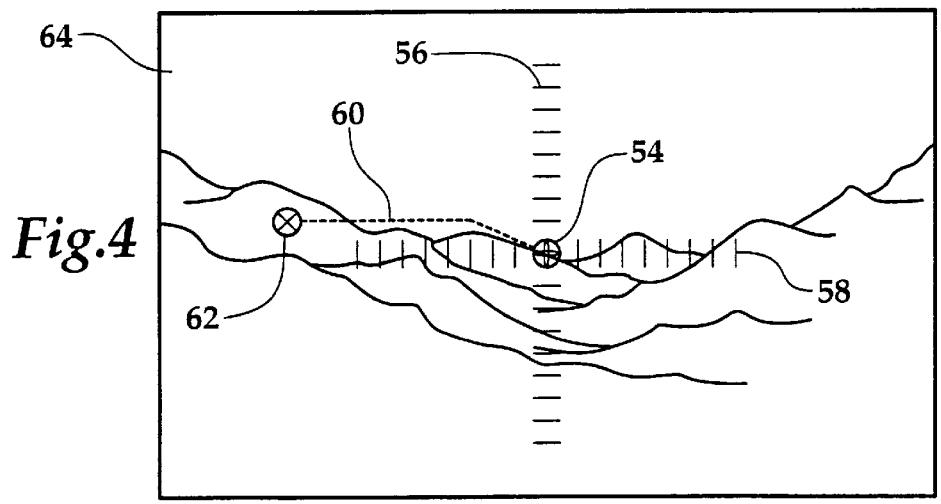
FIG. 4 is a schematic illustration of a display unit displaying a terrain elevation map for a system for creating an approach to a position on the ground of the present invention.

A terrain contour map 50 is shown in FIG. 3 that comprises a series of elevation profile contour lines 52. Projected onto the elevation profile contour map 50 is the aircraft symbology 54, the approach slope deviation indicator 56, the course deviation indicator 58, the approach 60 and the pilot selected landing position 62. In addition, a course orientation group 64 is displayed beside the contour map 50. Alternatively or in addition to the contour map 50, a terrain map 64 may be displayed on the display screen 38. This display provides the aircraft symbology 54 as well as the approach slope deviation indicator 56, the course deviation indicator 58, the approach 60 and the landing position 62.

Figures 5, 6, 7:
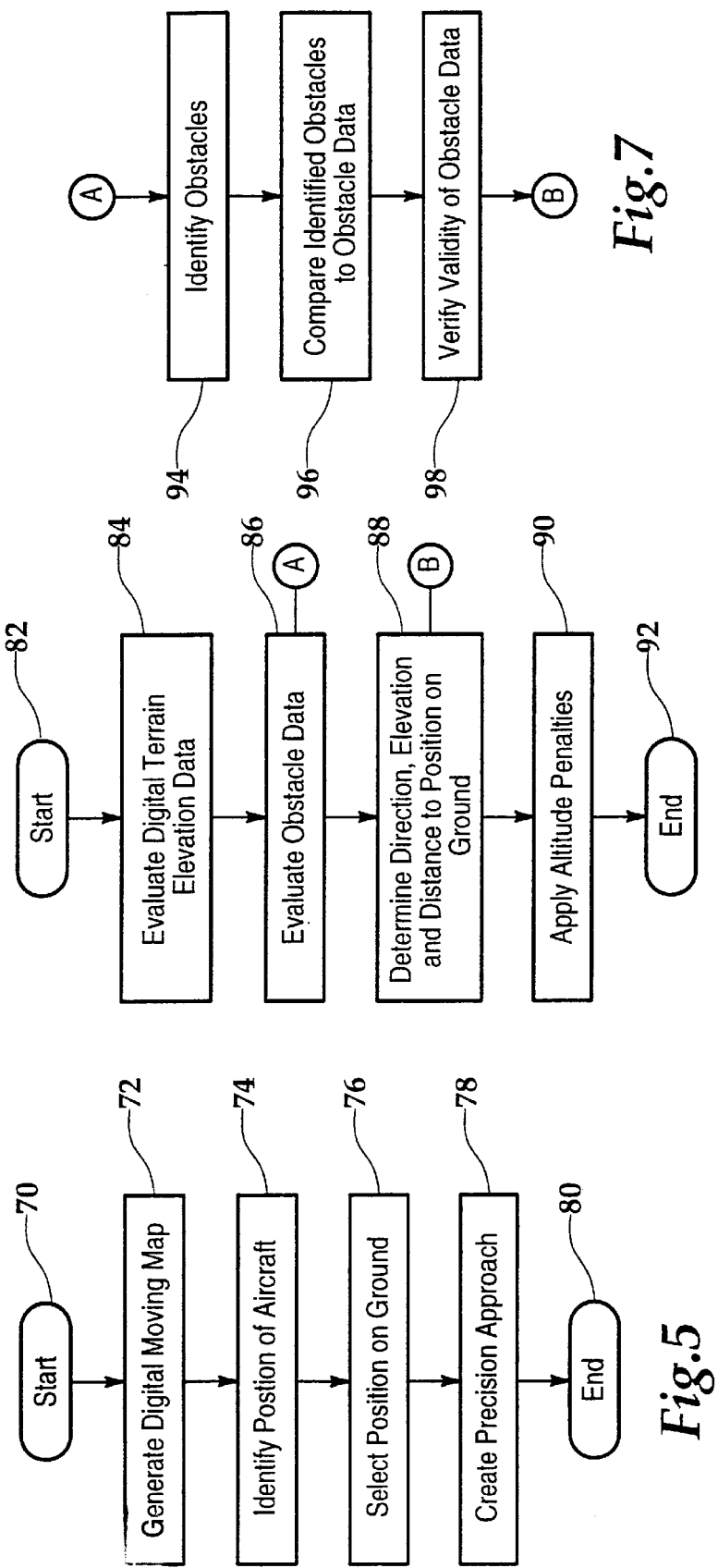
FIG. 5 is a flow diagram of steps in a method for creating an approach to a position on the ground of the present invention.
FIG. 6 is a flow diagram of steps in a method for creating an approach to a position on the ground of the present invention.
FIG. 7 is a flow diagram of steps in a method for creating an approach to a position on the ground of the present invention.

Referring now to FIG. 5, therein is described the method for creating an approach to a position on the ground for an in flight aircraft that begins with step 70. The steps of this method may preferably be carried out by a computer program that is embodied on a computer readable medium that is operating in conjunction with the processor 32 as described above with reference to FIG. 2. The processor 32 initially generates a digital moving map in step 72 by reading digital terrain elevation data and obstacle data from the database 34. In step 74, the position of the helicopter 12 is identified using information obtained via the GPS antenna 44 and the GPS receiver 42. The position of the helicopter 12 may then be identified on the digital moving map. Preferably, the aircraft symbology 54 is positioned in the middle of the digital moving map. In step 76, the pilot may select a position on the ground as displayed on the digital moving map using the input device 40. The processor 32 then creates a precision approach in step 78 which is displayed on the digital moving map. The method ends in step 80.

Step 78 of creating a precision approach may include the additional steps that begin at step 82. Step 84 includes the evaluation of the digital terrain elevation data obtained from the database 34. In addition, the processor 32 evaluates obstacle data from the database 34 in step 86. Once the digital terrain elevation data and obstacle data have been evaluated, the processor 32 determines the direction, elevation and distance to the position selected on the ground for landing the helicopter 12 in step 88. The processor 32 may, in addition, apply altitude penalties in step 90 for various hazards that must be taken into consideration for creating a precision approach such as obstacles and elevation changes in the terrain. This method ends with step 92.

In one embodiment of the present invention, the helicopter 12 includes a real time mapping device 24. As described in FIG. 7, the real time mapping device 24 maps the terrain and identifies any obstacles that are present in step 94. In step 96, the processor 32 compares these identified obstacles to obstacle data from the database 34. In step 98, the processor 32 verifies the validity of obstacle data in the database 34. If the identified obstacles are different from the obstacles stored in the database 34, this information is used to redesign or modify the precision approach created in step 78 if necessary.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for creating an approach for an aircraft to a position on the ground from a location above the ground comprising:

a display unit onboard the aircraft for displaying a digital moving map;

a database onboard the aircraft, the database containing digital terrain elevation data and obstacle data;

a global positioning receiver for identifying an in flight position of the aircraft;

an input device for selecting the position on the ground displayed on the digital moving map; and a processor onboard the aircraft communicably linked to the display unit, the database and the global positioning receiver, the processor generating the digital moving map on the display unit from the digital terrain elevation data and obstacle data and creating an approach for the aircraft to the position on the ground.

2. The system as recited in claim 1 wherein the display unit is a touch screen monitor.

3. The system as recited in claim 1 wherein aircraft symbology is positioned on the digital moving map based upon the in flight position of the aircraft.

4. The system as recited in claim 3 wherein the aircraft symbology is displayed on the display unit.

5. The system as recited in claim 1 wherein the approach further comprises an approach for instrument meteorological conditions.

6. The system as recited in claim 1 wherein the approach further comprises an approach for visual meteorological conditions.

7. The system as recited in claim 1 wherein the approach further comprises direction, elevation and distance from the location above the ground to the position on the ground.

8. The system as recited in claim 1 wherein the processor applies an altitude penalty for obstacles.

9. The system as recited in claim 1 further comprising a real-time mapping device for identifying obstacles in the approach, the identified obstacles being compared to the obstacle data in the database by the processor, thereby verifying the validity of the obstacle data in the database and allowing the process to modify the approach if necessary.

10. The system as recited in claim 9 wherein the real-time mapping device further comprises a Doppler radar.

11. The system as recited in claim 1 wherein the real-time mapping device further comprises a diode laser.

12. A method for creating an approach for an aircraft to a position on the ground from a location above the ground comprising the steps of:

generating a digital moving map on a display unit onboard the aircraft from digital terrain elevation data and obstacle data stored in a database onboard the aircraft;

identifying an in flight position of the aircraft with a global positioning receiver;

selecting the position on the ground displayed on the digital moving map; and creating an approach for the aircraft to the position on the ground.

13. The method as recited in claim 12 further comprising the step of displaying aircraft symbology on the digital moving map based upon the in flight position of the aircraft.

14. The method as recited in claim 13 wherein the step of displaying aircraft symbology on the digital moving map further comprises displaying the aircraft symbology in the middle of the display unit.

15. The method as recited in claim 12 wherein the step of creating an approach for the aircraft to the position on the ground further comprises creating an approach for instrument meteorological conditions.

16. The method as recited in claim 12 wherein the step of creating an approach for the aircraft to the position on the ground further comprises creating an approach for visual meteorological conditions.

17. The method as recited in claim 12 wherein the step of creating an approach for the aircraft to the position on the ground further comprises determining direction, elevation and distance from the location above the ground to the position on the ground.

18. The method as recited in claim 12 further comprising the step of applying an altitude penalty for obstacles.

19. The method as recited in claim 12 further comprising the steps of identifying obstacles in the approach, comparing the identified obstacles to the obstacle data in the database, verifying the validity of the obstacle data in the database and modifying the approach if necessary.

20. The method as recited in claim 19 wherein the step of identifying obstacles in the approach device further comprises operating a Doppler radar.

21. The method as recited in claim 19 wherein the step of identifying obstacles in the approach device further comprises operating a diode laser.

22. A computer program embodied on a computer readable medium for creating an approach for an aircraft to a position on the ground from a location above the ground comprising:

a code segment for generating a digital moving map on a display unit onboard the aircraft from digital terrain elevation data and obstacle data stored in a database onboard the aircraft;

a code segment for identifying an in flight position of the aircraft with a global positioning receiver;

a code segment for selecting the position on the ground displayed on the digital moving map; and a code segment for creating an approach for the aircraft to the position on the ground selected on the digital moving map from the location above the ground.

23. The computer program as recited in claim 22 further comprising a code segment for displaying aircraft symbology on the digital moving map based upon the in flight position of the aircraft.

24. The computer program as recited in claim 22 further comprising a code segment for creating an approach for instrument meteorological conditions.

25. The computer program as recited in claim 22 further comprising a code segment for creating an approach for visual meteorological conditions.

26. The computer program as recited in claim 22 further comprising a code segment for determining direction, elevation and distance from the location above the ground to the position on the ground.

27. The computer program as recited in claim 22 further comprising a code segment for applying an altitude penalty for obstacles.

28. The computer program as recited in claim 22 further comprising a code segment for comparing obstacles identified with a real-time mapping device with obstacle data in the database, a code segment for verifying the validity of the obstacle data in the database and a code segment for modifying the approach if necessary.

* * * * *